(12) United States Patent
Bang

(10) Patent No.: US 6,618,241 B2
(45) Date of Patent: Sep. 9, 2003

(54) COMPUTER SYSTEM

(75) Inventor: Seog Bang, Yongin (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/907,918

(22) Filed: Jul. 19, 2001

(65) Prior Publication Data

US 2002/0060899 A1 May 23, 2002

(30) Foreign Application Priority Data

Nov. 17, 2000 (KR) ........................................ 2000-68606

(51) Int. Cl.⁷ ................................................. G06F 1/16
(52) U.S. Cl. ........................ 361/681; 361/719; 248/918; 312/223.1
(58) Field of Search ................................. 361/681, 679, 361/686, 719, 796, 724–728; 248/917–923, 185; 312/223.1–223.6

(56) References Cited

U.S. PATENT DOCUMENTS

| | | | | |
|---|---|---|---|---|
| 5,108,062 A | * | 4/1992 | Detwiler | 248/185 |
| 6,442,026 B2 | * | 8/2002 | Yamaoka | 361/704 |
| 6,452,809 B1 | * | 9/2002 | Jackson et al. | 361/796 |
| 2002/0015282 A1 | * | 2/2002 | Bang | 361/681 |

FOREIGN PATENT DOCUMENTS

| | | |
|---|---|---|
| JP | 57-197139 | 12/1982 |
| JP | 07-124997 | 5/1995 |
| JP | 07-285137 | 10/1995 |
| JP | 08-25409 | 1/1996 |
| JP | 09-39022 | 2/1997 |
| KR | 1996-19859 | 7/1996 |
| KR | 1999-69546 | 9/1999 |
| KR | 1999-38990 | 11/1999 |

* cited by examiner

Primary Examiner—Darren Schuberg
Assistant Examiner—Hung Van Duong
(74) Attorney, Agent, or Firm—Robert E. Bushnell, Esq.

(57) ABSTRACT

A computer system comprises a display unit, a main body to which the display unit is supportedly coupled, and a stand provided at one side of the main body. The stand includes a support plate which supports the main body, and a reinforcement plate which is insert-molded into the support plate so as to reinforcedly support the support plate. With this configuration, the computer system has a compact and strong structure due to the structure of the support plate. The stand also includes a decoration cover which is disposed on the support plate, and which is coupled to the support plate and the reinforcement plate.

20 Claims, 5 Drawing Sheets

COMPUTER SYSTEM

CLAIM OF PRIORITY

This application makes reference to, incorporates the same herein, and claims all benefits accruing under 35 U.S.C. §119 from my application COMPUTER filed with the Korean Industrial Property Office on Nov. 17, 2000 and there duly assigned Ser. No. 68606/2000.

BACKGROUND OF THE INVENTION

1. Technical Field

The present invention relates to a computer system and, more particularly, to a computer system having an improved stand structure.

2. Related Art

A computer system generally comprises a main body, a display device and an input device. To the main body are mounted a central processing unit (CPU), a random access memory (RAM) and a variety of cards, including a disk driver card, a graphic card, etc. The display unit is electrically connected to the main body so as to display an image by means of various devices within the main body. The input unit comprises a keyboard, a mouse, etc. which allow a user to input information as desired.

The main body or the display unit is supported on a stand. Generally, the stand is made of plastic and is molded integrally with the main body or the display unit, and it has a thickness which is sufficient to stand the weight thereof. Occasionally, a plastic stand holding the main body or the display unit and a metallic reinforcement plate reinforcing the strength of the stand are manufactured independently, and are then assembled to each other by means of a double-sided adhesive tape or a bond in an attempt to make them smaller and thinner so as to meet the user's requests. However, such an arrangement used for a conventional computer system has shown a problem in that the plastic stand molded integrally with the computer must be made thick, considering the strength of the plastic material, and thereby the overall arrangement is enlarged in size. Where the stand and the reinforcement plate are separately manufactured, both are coupled by a double-sided adhesive tape or bond, making it complicated to manufacture the computer. Further, when the computer is used for a long time, the coupling force becomes weakened, and the stand and the reinforcement plate have a risk of being easily detached due to external impact while the computer is being carried.

The following are considered generally pertinent to the present invention but are burdened by the disadvantages set forth above: Korean patent publication No. 1996-19859 to Seung-Ryong Yang, entitled *INSERTION MOLDED SYNTHETIC RESIN SUPPORT FOR A SHAFT ATTACHED TO A WALL*, published on Jul. 18, 1996; Korean patent publication No. 1999-38990 to Byung-Kwan Jung, entitled *ROTATION SUPPORT FOR LCD MONITOR*, published on Nov. 5, 1999, Korean patent publication No. 1999-69546 to Chil-Hong Cho, entitled *MONITOR STAND ASSEMBLY*, published on Sep. 6, 1999, Japanese patent publication No. 57-197139 to Asano et al., entitled *COMPOSITE MOLDING OF METAL PLATE AND RESIN*, published on Dec. 3, 1982; Japanese patent publication No. 07-124997 to Nezu, entitled *OUTSERT MOLDED ARTICLE*, published on May 16, 1995; Japanese patent publication No. 07-285137 to Kimura, entitled *COMPOSITE BODY CONSTITUTED OF DIFFERENT MATERIALS AND PRODUCTION THEREOF*, published on Oct. 31, 1995; Japanese patent publication No. 08-025409 to Ishizuka, entitled *MANUFACTURE OF HOUSING*, published on Jan. 30, 1996; and Japanese patent publication No. 09-039022 to Kubo, entitled *INTEGRATED MOLDED PRODUCT CONSISTING OF THERMOPLASTIC RESIN AND HARD SUBSTRATE*, published on Feb. 10, 1997.

SUMMARY OF THE INVENTION

Accordingly, the present invention has been made keeping in mind the above-described shortcomings, and an object of the present invention is to provide a computer system having a compact and strong stand produced through a simplified process.

This and other objects of the present invention may be accomplished by provision of a computer system comprising a display unit, a main body to which the display unit is supportedly coupled, and a stand provided at one side of the main body for supporting the main body, wherein the stand includes a support plate supporting the main body, and a reinforcement plate insert-molded into the support plate so as to provide reinforced support for the support plate.

A plurality of through holes is preferably provided in the reinforcement plate, through which holes the support plate is coupled to the reinforcement plate when the support plate is molded.

Preferably, the support plate is made of plastic, the reinforcement plate is made of metal, and a plurality of slots is provided in the support plate.

The computer system further comprises a decoration cover removably attached to an outer surface of the support plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENTS

Hereinbelow, the present invention will be described in more detail with reference to the accompanying drawings.

Figure 1:
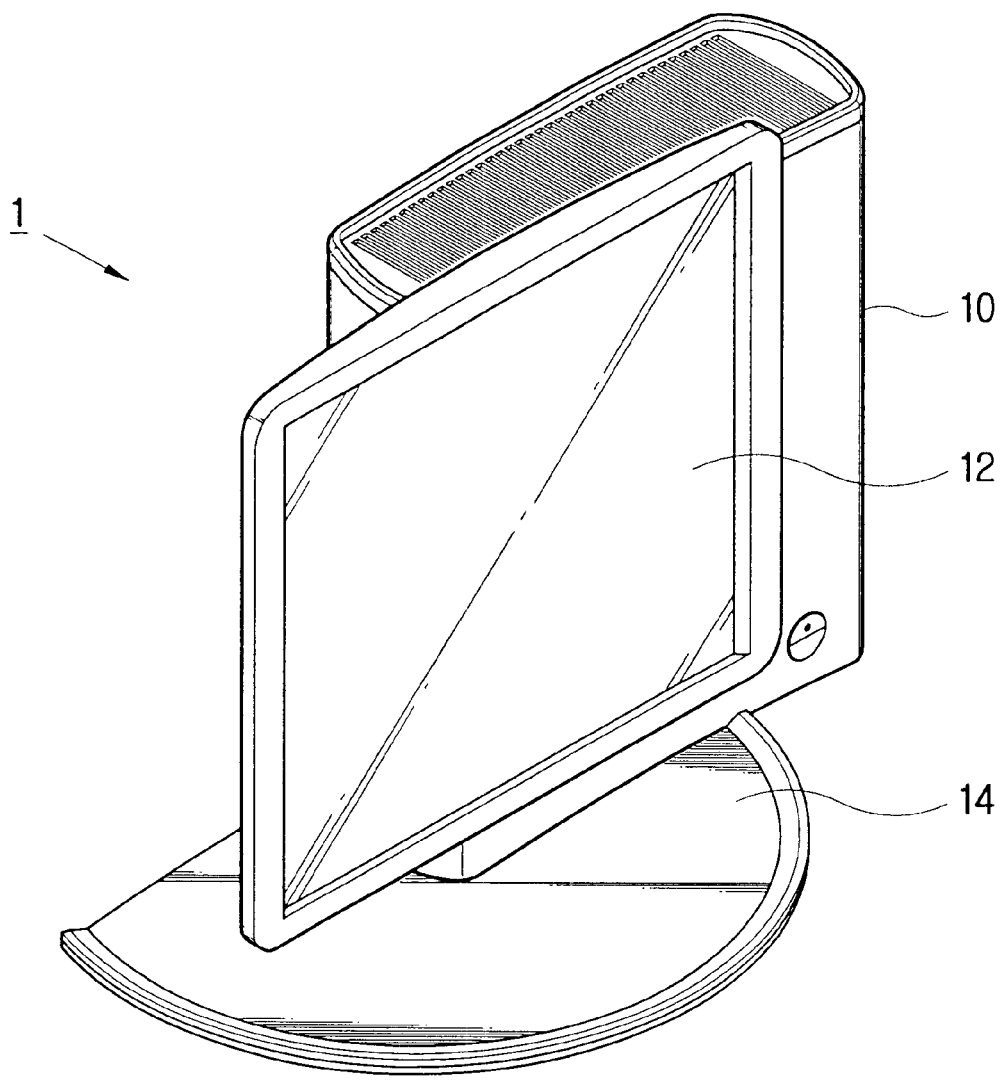
FIG. 1 is a perspective view of a computer system according to the present invention.

FIG. 1 is a perspective view of a computer system according to the present invention. Referring to FIG. 1, according to one embodiment of the present invention, computer system 1 comprises: a main body 10 including a main board (not shown) to which a central processing unit (CPU), a random access memory (RAM), and a variety of cards such as a disk drive, a graphic card, etc. are mounted;

a display unit 12 supportedly coupled to the main body 10; a stand 14 provided on the bottom of the main body 10 so as to support the main body 10; and an input unit (not shown) having a keyboard, a mouse, etc., allowing a user to input information into computer system 1.

Figure 2:
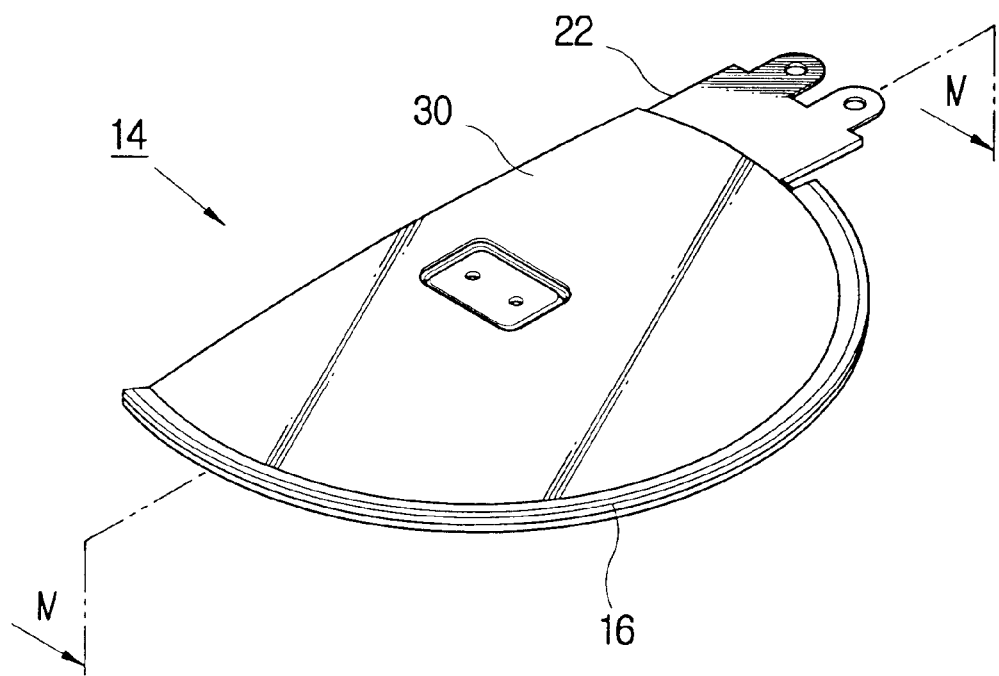
FIG. 2 is a perspective view of the stand of FIG. 1.
Figure 3:
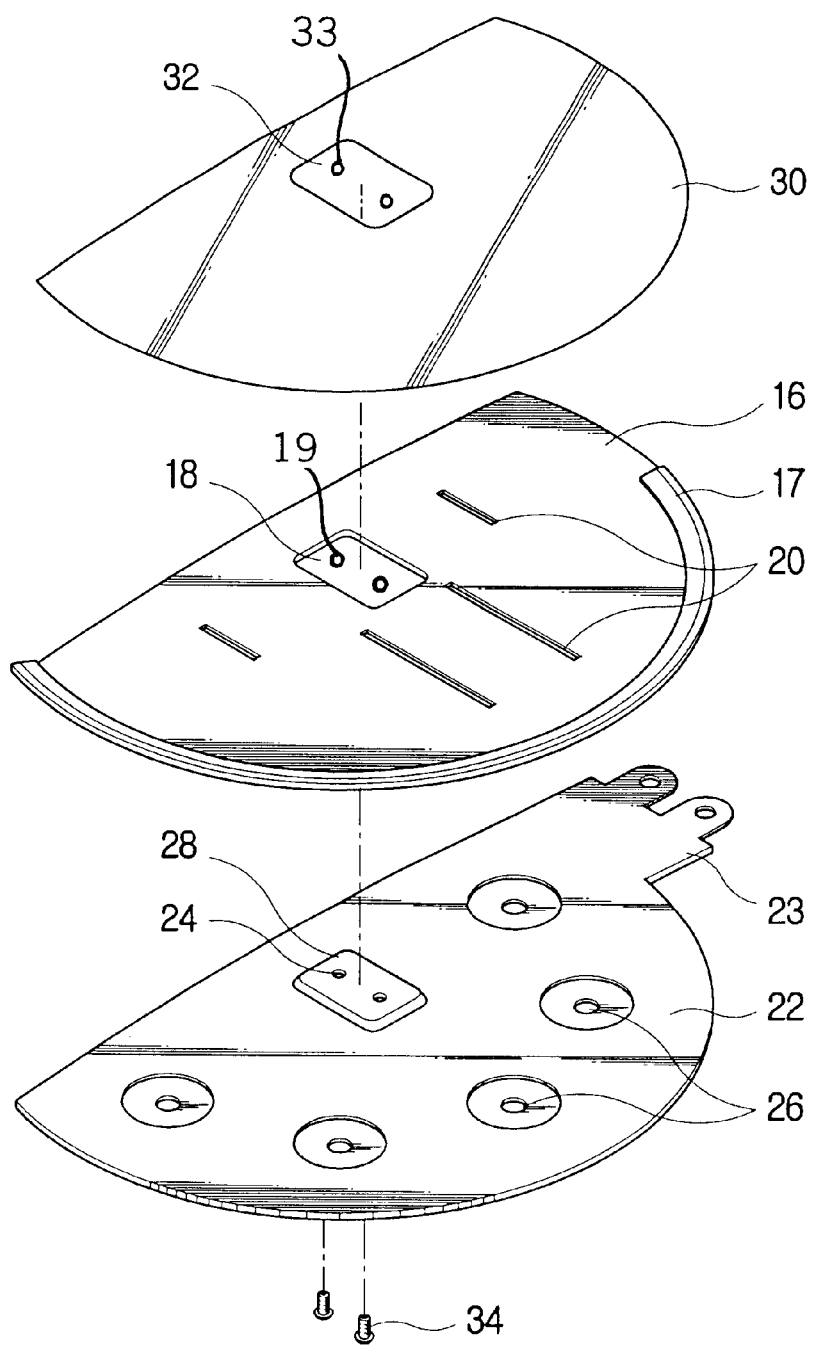
FIG. 3 is an exploded perspective view of the stand of FIG. 2.
Figure 4:
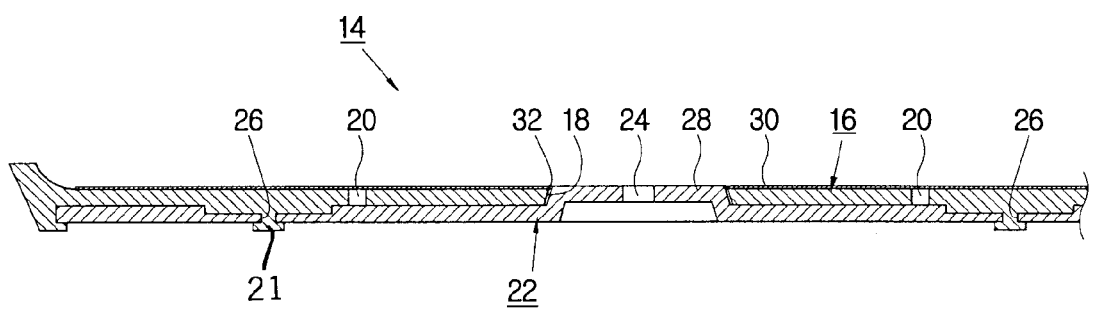
FIG. 4 is an enlarged sectional view of FIG. 2 taken along line IV—IV.

FIG. 2 is a perspective view of the stand of FIG. 1, FIG. 3 is an exploded perspective view of the stand of FIG. 2, and FIG. 4 is an enlarged sectional view of FIG. 2 taken along line IV—IV. As shown in FIGS. 2 thru 4, the stand 14 comprises a support plate 16 contacting the bottom face of the main body 10 so as to be held thereby, and a reinforcement plate 22 inserted into the support plate 16 and by means of which the support plate 16 is supported in a reinforced manner. The support plate 16 is semi-circular and is made of plastic by injection molding. On the edge of the support plate 16 is formed an extension unit 17 which extends upwardly to a predetermined length along the circumference thereof. One end of the extension unit 17 closely supports a lower side part of the main body 10 shown in FIG. 1. Screws 34 penetrate through the support plate 16 so as to fix it to the main body 10. The support plate 16 has a groove 18 formed therein for accommodating a protrusion 28 of the reinforcement plate 22 to be described later. Around the groove 18 is formed a plurality of slots 20 for preventing the support plate 16 from being bent due to a heat deformation resulting from the difference in materials of the support plate 16 and the reinforcement plate 22 when the support plate 16 is inserted into the reinforcement plate 22.

The reinforcement plate 22 includes an extended support 23 made of a metallic material for reinforced support of the support plate 16, the reinforcement plate 22 being semi-circular in shape in correspondence to the support plate 16. The extended support 23 radially extends to a predetermined length on one side of the circumference thereof. The extended support 23 is closely supported on the bottom face of the main body 10. As described above, the reinforcement plate 22 has a protrusion 28 upwardly protruding to a predetermined height so as to be accommodated within the groove 18 of the support plate 16. In the protrusion 28, there is at least one hole 24 through which a screw 34 passes so as to be fixed to the main body 10. Around the protrusion 28, there is provided a plurality of through holes 26 allowing a mold 21 of the support plate 16 to pass through the reinforcement plate 22 when the support plate 16 is insert-molded into the reinforcement plate 22, thereby forcibly coupling the support plate 16 and the reinforcement plate 22.

On top of the support plate 16, there is disposed a plate decoration cover 30 which is removably coupled to the top face of the support plate 16. The decoration cover 30 is semi-circular in correspondence to the shape of support plate 16. The decoration cover 30 has a portion 32 in which there is formed at least one through hole 33 through which screw 34 passes so that cover 30 is screw-coupled to the main body 10. The through hole(s) 33 is (are) positioned opposite to the hole(s) 19 of the support plate 16. Preferably, in order to improve the external appearance of the stand 14 and allow a user to replace the decoration cover 30 according to his/her preference, the decoration cover 30 can be provided in a variety of colors.

With this configuration, the process of assembling the stand 14 according to the present invention can be described as follows.

First, the reinforcement plate 22 made of a metallic material is inserted into a mold (not shown) corresponding in shape to the support plate 16, and the reinforcement plate 22 is insert-molded by insertion of plastic molding into the mold. The plastic molding forms the external appearance of the support plate 16, and a mold 21 passes through each of the through holes 26 of the reinforcement plate 22 so as to allow the reinforcement plate 22 to be forcibly coupled to the support plate 16. The support plate 16 is prevented, by the slots 20 formed in the support plate 16, from being bent because of heat deformation resulting from the difference in materials of the support plate 16 and the reinforcement plate 22.

Next, the decoration cover 30 is attached to the top of the support plate 16 for which molding has been completed. The screw(s) 34 is (are) fixed into the bottom face of the main body 10 through the hole(s) 24 of the reinforcement plate 22, and the stand 14 is coupled to the main body 10.

Figure 5:
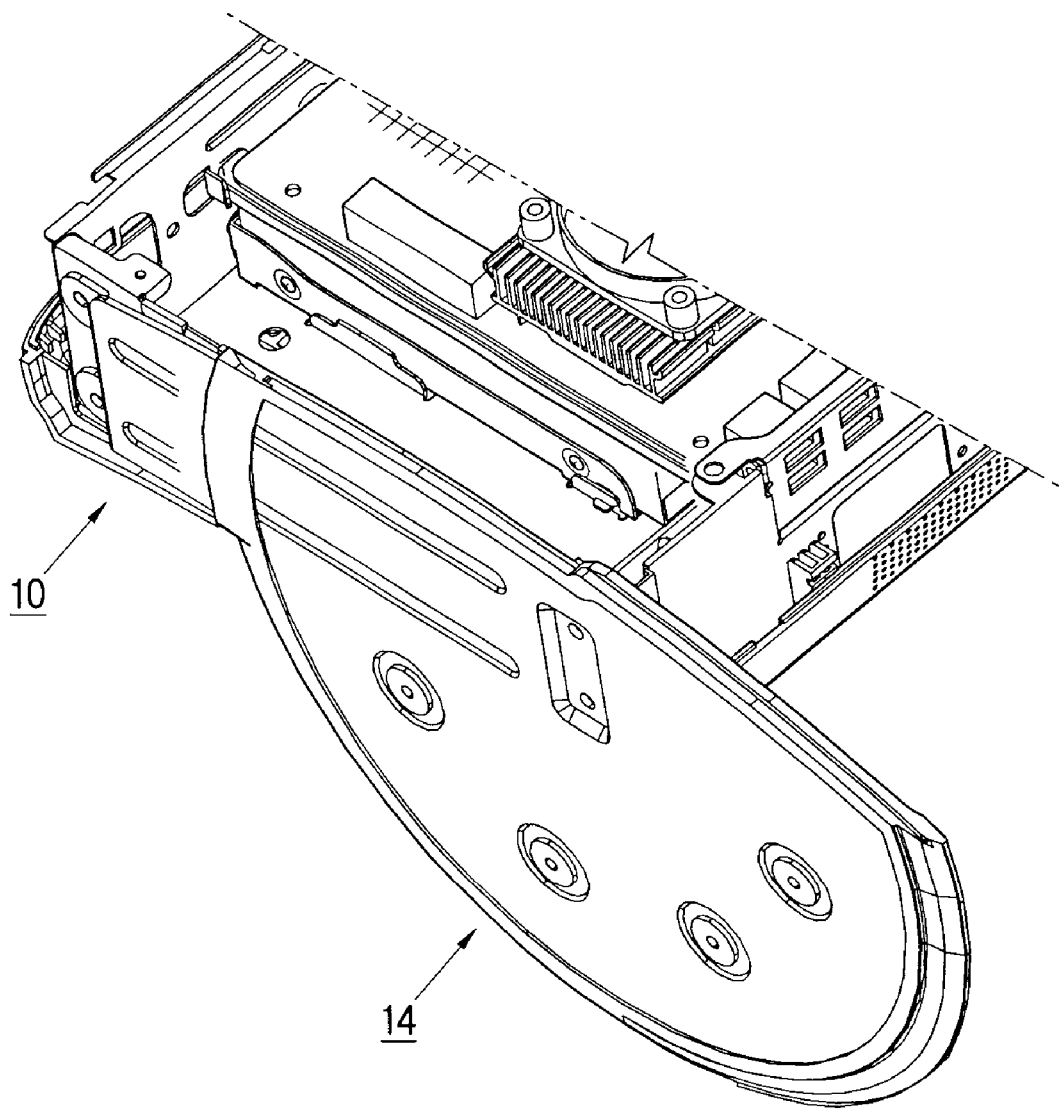
FIG. 5 is a perspective view showing a state in which a main body of the computer and the stand of FIGS. 2 thru 4 are coupled.

FIG. 5 is a perspective view showing a state in which the main body of the computer and the stand are coupled according to the above-described process.

The stand 14 can be supportingly coupled to sides of the main body 10 other than the bottom face thereof. Although this has not been specifically described with respect to the above embodiment, such coupling is obvious to one of skill in the art from this disclosure.

Instead of supporting the stand 14 and the main body 10 by screw-coupling as described above, a recess (not shown) formed in one side of the main body can be provided with a protrusion extending upwardly from the stand 14 so as to supportedly couple the main body 10 and the stand 14. The support plate 16, the reinforcement plate 22 and the decoration cover 30 may have a circular, an oval or a polygonal shape, instead of the semi-circular shape shown herein. In addition, the support plate 16 may be made of rubber or the like, instead of plastic.

By molding the reinforcement plate 22 for insertion into the support plate 16 of the stand 14, the process of manufacturing the stand 14 is simplified. Also, the stand 14 becomes compact and stable. In addition, a plurality of decoration covers 30 can be removably attached to an outer surface of the support plate 16 and they can be of a variety of colors, thereby enhancing the external appearance of the stand 14 and allowing the user to replace it with a decoration cover 30 of another color according to his/her preference.

As described above, according to the present invention, a computer system having a compact and strong stand has been provided by improving the structure of the stand.

Although the preferred embodiment of the present invention has been disclosed for illustrative purposes, those skilled in the art will appreciate that various modifications, additions and substitutions are possible without departing from the scope and spirit of the invention as disclosed in the accompanying claims.

What is claimed is:

1. A computer systems comprising:
   a main body which includes a central processing unit and a memory;
   a display unit supportedly coupled to the main body for displaying images in response to operation of the central processing unit and the memory; and
   a stand provided on one side of the main body for supporting the main body;
   wherein the stand includes a support plate supporting the main body, and a reinforcement plate insert-molded into the support plate so as to provide reinforced support for the support plate.

2. The computer system according to claim 1, wherein a plurality of through holes is provided in the reinforcement plate for receiving molds of the support plate so that the support plate is coupled to the reinforcement plate when molding the support plate.

3. The computer system according to claim 1, wherein the support plate is made of plastic and the reinforcement plate is made of metal.

4. The computer system according to claim 1, wherein the support plate is made of plastic.

5. The computer system according to claim 1, wherein the reinforcement plate is made of metal.

6. The computer system according to claim 1, wherein a plurality of slots is formed in the support plate for preventing bending of the support plate due to heat deformation.

7. The computer system according to claim 1, wherein the support plate has an extension unit formed on a circumference of the support plate, said extension unit extending upward for supporting the main body.

8. The computer system according to claim 1, wherein the support plate has an extended support extending from a side of said support plate, said extended support being closely supported on a bottom face of said main body.

9. The computer system according to claim 1, further comprising a decoration cover removably attached to an outer surface of the support plate.

10. The computer system according to claim 1, wherein at least one through hole is formed in said reinforcement plate, and at least one additional through hole is formed in said support plate, said at least one through hole being aligned with said at least one additional through hole for receiving at least one screw for coupling said reinforcement plate and said support plate.

11. The computer system according to claim 1, wherein said support plate has a groove formed on a surface thereof and said reinforcement plate has a protrusion formed in a surface thereof, said protrusion being received by said groove when the reinforcement plate is insert-molded into the support plate.

12. The computer system according to claim 3, wherein a plurality of slots is formed in the support plate for preventing bending of the support plate due to heat deformation.

13. The computer system according to claim 9, wherein at least one through hole is formed in said decoration cover, and at least one additional through hole is formed in said support plate, said at least one through hole being aligned with said at least one additional through hole for receiving at least one screw for coupling said decoration cover and said support plate.

14. The computer system according to claim 13, wherein at least one further through hole is formed in said reinforcement plate and is aligned with said at least one through hole and said at least one additional through hole for receiving said at least one screw so that said reinforcement plate is coupled to said support plate and said decoration cover.

15. A computer system, comprising:
- a main body which includes a central processing unit and a memory;
- a display unit supportedly coupled to the main body for displaying images in response to operation of the central processing unit and the memory; and
- a stand provided on one side of the main body for supporting the main body;
- wherein the stand includes a support plate supporting the main body, and a decoration cover removably attached to an outer surface of the support plate.

16. The computer system according to claim 15, wherein the support plate has an extension unit formed on a circumference of the support plate, said extension unit extending upward for supporting the main body.

17. The computer system according to claim 15, wherein the support plate has an extended support extending from a side of said support plate, said extended support being closely supported on a bottom face of said main body.

18. The computer system according to claim 15, wherein at least one through hole is formed in said decoration cover, and at least one additional through hole is formed in said support plate, said at least one through hole being aligned with said at least one additional through hole for receiving at least one screw for coupling said decoration cover and said support plate.

19. The computer system according to claim 18, further comprising a reinforcement plate insert-molded into the support plate so as to reinforce the support plate.

20. The computer system according to claim 19, wherein at least one further through hole is formed in said reinforcement plate and is aligned with said at least one through hole and said at least one additional through hole for receiving said at least one screw so that said reinforcement plate is coupled to said support plate and said decoration cover.

* * * * *